United States Patent
Shimizu et al.

(10) Patent No.: US 6,816,166 B2
(45) Date of Patent: Nov. 9, 2004

(54) IMAGE CONVERSION METHOD, IMAGE PROCESSING APPARATUS, AND IMAGE DISPLAY APPARATUS

(75) Inventors: Junya Shimizu, Kawasaki (JP); Kazuo Sekiya, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 09/791,982

(22) Filed: Feb. 23, 2001

(65) Prior Publication Data

US 2001/0020950 A1 Sep. 13, 2001

(30) Foreign Application Priority Data

Feb. 25, 2000 (JP) ........................................ 2000-050049

(51) Int. Cl.[7] .............................................. G09G 5/00
(52) U.S. Cl. .................. 345/581; 345/429; 345/798; 345/799; 345/800; 345/801; 345/600; 345/660; 345/663
(58) Field of Search ................................ 345/429, 600, 345/660, 663, 581, 798, 799, 800, 801, 629

(56) References Cited

U.S. PATENT DOCUMENTS 5,335,296 A * 8/1994 Larkin et al. ................. 382/47
5,760,922 A * 6/1998 Kojima ........................ 358/464

* cited by examiner

Primary Examiner—Matthew C. Bella
Assistant Examiner—Tam Tran
(74) Attorney, Agent, or Firm—Lynn L. Augspurger; William A. Kinnaman, Jr.

(57) ABSTRACT

It is one object of the present invention to obtain a clear scaled image, without impairing the rough shape of fonts or the like, on a graphics screen that is handled by an information display device such as an LCD panel or a projector, and that includes a lot of stepped edges like thin lines. According to the present invention, an image processing apparatus for applying a resolution conversion on original image data to generate a converted image scaled by rational number or integral number of times, comprises: an original image data input unit 11 for inputting the original image; an algorithmic nonlinear processing unit 12 for generating a first converted image data, wherein connect relations are maintained for a line width included in the original image data even after the resolution conversion; a multirate processing unit 13 for generating a second converted image data, wherein the resolution conversion is performed on the original image data while maintaining a rough shape of the line width; and a mixing unit 15 for mixing the first converted image data and the second converted image data according to the weighting by a weight determination unit 14.

1 Claim, 15 Drawing Sheets

IMAGE CONVERSION METHOD, IMAGE PROCESSING APPARATUS, AND IMAGE DISPLAY APPARATUS

BACKGROUND OF THE INVENTION

1. Field of the Invention

The present invention relates to a method and an apparatus for converting the resolution of an image consisting of a set of pixels that are represented by digital values.

2. Description of the Related Art

So far, it has been assumed that such an image that is taken from real world to a photo and digitized is the object of resolution conversion, and that a change of pixel values is continuous and a discontinuous boundary has a sufficient size. Most conventional image expansion techniques aim at natural images, which rarely have stepped edges such as thin lines in themselves. This is mainly because information is recorded, while the stepped edge is transformed, by the lowpass effects of an image pickup apparatus, into a form represented by a sigmoid function (a differentiable, continuous function represented by $f(x)=1/(1+(e^{-x}))$. Therefore, so far, improvements have been made to find how to make the outline, which would become blurrier than necessary, appear natural, with the assumption that the original image was obtained by sampling a lowpass filtered image.

For resolution conversion which requires the least computations and can be easily implemented, the replica and nearest neighbor methods are pointed to among conventional ones. The replica method is the simplest one by which an image can be expanded (n+1)/n times by copying the same pixels every n-th pixel. On the other hand, the nearest neighbor method is the one by which an image is expanded by copying the pixel of the original image that is closest to the coordinates obtained after the resolution conversion. Both the replica method and the nearest neighbor method provide substantially the same effects; i.e. the mixing of colors among pixels does not occur, and color tones are completely held.

Also, two methods, i.e. bilinear interpolation and bicubic (cubic convolution) interpolation are well known for the conversion of resolutions. With bilinear interpolation, the coordinates of a pixel point for a resultant image are inversely mapped to the coordinates of the original image. Then, the adjacent pixels of the original image (four surrounding points, two points on both sides, or only one point located at the identical coordinate) are weighted, by using distances, to obtain an average value, which is subsequently regarded as the color of the resultant image. On the other hand, bicubic interpolation is extended up to 2 rounds (16 points) in the vicinity based on the same idea as bilinear interpolation. According to this method, it is assumed that the one-order differential continuity and the change of values (i.e. slope) of the original image are sufficiently moderate. Colors are enhanced by the weights of parameters, which provides the advantage of making them clearer than bilinear method.

In addition, a method that generalizes the above interpolation methods and that requires much more computations, is identified as multirate system. In general, a digital signal processor (DSP) is required in order to implement this multirate system. The basic framework of the multirate system is to apply lowpass filtering after up-sampling with zero-value interpolation, and further to apply down-sampling with decimation to obtain a predetermined expansion factor. This framework can theoretically comprehend the bilinear interpolation and the bicubic interpolation by using the frequency characteristics of the lowpass filter. Practically, implementations called polyphase configuration or filter bank configuration are often used in order to reduce the computational load.

However, according to the replica method and the nearest neighbor method, the pixel of an original image is simply held at a new spatial sampling point, and the expanded line width differs depending on the coordinate positions. Since the sensitivity to frequency components of human eyes is high to low frequencies for the angle unit, a serious problem occurs in the readability of a line width in these methods.

Further, according to the bilinear interpolation method, when the coordinates that are determined for an inversely projected image are located at the same distance on either side of a one-dot width line, the resultant image will invariably represent a line as wide as two lines of a half a color. Therefore, problems occur relative to the uniformity of colors, the legibility of characters and the reproduction fidelity of colors. Although an image in a photo may appear to be satisfactory, the overall impression is of a blur.

Furthermore, the bicubic interpolation method has the same problem as does bilinear interpolation method, where one line is changed into two lines half a color. Thus, the accurate reproductivity of colors of the screen image of a personal computer (hereinafter referred to as a PC) is still problematic. Also, there is a slight occurrence of ringing at sharp boundaries between middle tone colors.

Moreover, when any given lowpass filter is employed for the above multirate system, checkerboard distortion may appear in a resultant image, thereby imposing constraints upon filter designs. That is, constraints are placed on filter designs depending upon the images that are to be processed and required filter conditions, such as, the filter characteristics for a passing band or blocking band must be flat, or a filter for down-sampling be separately provided in order to introduce an average operation. It is preferable that an FIR (Finite Impulse Response) filter be used to maintain the linear phase of an image, however, typically a higher order filter is required to obtain an image quality that is higher than what is acquired by the bilinear or bicubic interpolation method. So it is believed necessary to use a dedicated DSP. In addition, as a problem associated with using the higher order filter, what has a thin line structure as a font, is expanded more than necessary to appear.

In U.S. Pat. No. 5,594,676, a method for scaling is proposed wherein the filtering ranging from 3×3 to maximum 65×65 is performed by changing the number of pixels used in the interpolation according to the position of a pixel. However, on a PC screen subject to the present invention, since there are a number of changes of a stepped edge with one pixel width, the above prior methods can not perform a proper resolution conversion. Now let's consider the reason in terms of a multirate system.

FIG. 13 depicts a multirate system performing U/D-fold sampling-rate conversion. First, converting an input x[n] comprising n sample points to n·U data string using an up-sampling(↑U) 201, then passing through a lowpass filter 202, and finally obtaining m=n·U/D resultant data string y[m] using down-sampling(↓D) 203. In up-sampling, U−1 zero values are added per one of x[n] data.

FIG. 14 depicts an example of one-dimensional signals using U=3 for up-sampling. An upper left diagram shows the input string, while an upper right diagram shows the first twenty of data string that were increased three times with the interpolation of zero values. A horizontal axis of these diagrams represents a discrete sampling number, while a vertical axis represents an amplitude (level). A lower left diagram depicts a result of x[n] after FFT (Fast Fourier Transform), while a lower right diagram depicts a result of up-sampled 3·n data string after FFT. A horizontal axis of these diagrams represents a normalized frequency [Hz], while a vertical axis represents a spectral amplitude represented by square of an absolute. Both of them normalize the frequency to [0,1], wherein 0 corresponds to a lower frequency. As can be seen in the lower right diagram, the frequency components of an original image is reduced to one U-th., while at the same time imaging components appear in the higher frequency domain.

FIG. 15 depicts an example of one-dimensional signals using D=3 for down-sampling. A horizontal axis and a vertical axis are the same as those shown in FIG. 14. In downsampling, decimation is performed to retrieve one from n·U data string at every D data. In this down-sampling example, an upper left diagram shows not the up-sampled result, but any given input string. An upper right diagram shows data string decimated to one third by picking up the input string every three points, which is comprised of triple string of points shown in the upper left diagram. The lower left and lower right diagrams are respectively what normalizes the FFT results. After one D-th. of decimation has been done, it is seen that the frequency components extend D times and that the gain decreases to one D-th. However, if the input string to this down-sampling has a frequency component higher than 1/D, the expanded frequency components exceed 1 so that aliasing components occur in the resultant spectrum. Therefor, in order to preserve frequency components of an original image without being affected by imaging components and aliasing components and to make U/D-fold sampling-rate conversion, a lowpass filter (H(z)) 202, which has a passing band of $[0, \min(f_s^x/U, f_s^x/D)]$, must be disposed between an up-sampling and a down-sampling, where $f_s^x$ is half the sampling frequency of the image displayed at resolution x.

That a frequency component of an image exists even at $f_s^x$ without deterioration compared with the other components, means that a change of fonts or the like, which are used on an information display screen, can represent a steep signal in almost ideal form at a given resolution. Namely, if an $f_s^x$ component and its nearby frequency components attenuate, the display screen is involved in blur. Assuming that frequency components range from 0 to $f_s^x$, spectral components that an image (resolution y) owns after the sampling-rate conversion with the multirate processing has been done, range from 0 to $Df_s^y/U$ with keeping the original spectral profile, wherein since considering the expansion of an image now, this gives D/U<1, as a result frequency components from $Df_s^y/U$ to $f_s^y$ become zero. Conventional methods such as bilinear interpolation and bicubic interpolation can be comprehended in the framework of this multirate processing, and a discussion can be resolved into the difference of frequency characteristics of the lowpass filter, however, as long as within a framework of multirate processing, frequency components higher than $Df_s^y/U$ can not be generated, thus for an image whose original image has steep changes of a computer screen or the like, the expansion is difficult while preserving stepped edges. Particularly in a PC screen, an image adequately has frequency components up to $f_s^y$ essentially independent of the resolution. Therefor, given a lack of this part, a blurring impression is given, which is considered to be a more difficult problem than expansion of natural images.

Summarizing the above, as is evident from the existence of a lowpass filter, as the result of expansion processing in the framework of the multirate system, there are only frequency components lower than the sampling frequency which are expressible at the resolution after the expansion. Therefor, it is difficult to preserve stepped edges, thus they would become blurry to be sigmoid and as a whole, an image with a blurred impression would be brought. To cope with the above problems, several methods have been proposed to improve a blurred outline in the bilinear or bicubic interpolation. However, they have the following problems.

In an article Proceedings of the 1999 IEICE General Conference D-11-120 a method for detecting an edge of an original image, and reconstructing an edge having a slope that corresponds to that of the detected edge for the resultant image is proposed. This is a method regarded as reprocessing a part of high frequency components, where the jaggies that are generated due to the expansion of an oblique line can be replaced on the resultant image with fine steps. According to this method, however, a 3×3 sized filter, at the least, must be employed to detect the edge, and the fine structure of fonts can not be expanded. As is shown in FIG. 16, for example, protrusions of a transverse line of a letter "t" are converted to a rounded bulge.

In an article IEEE Proceedings of International Conference on Image Processing 1997, vol. I, pp. 267–270, October 1997, a method is described wherein linear expansion is employed after an edge enhancement processing for an original image has been done. Though this method consequently augments high frequency components, it assumes that there are boundary widths that can be detected by an edge detection filter, thus for an object smaller than the size of the edge detection filter, it is less effective. In addition, unless shaping is applied for an oblique boundary, stair-stepping jaggies would be produced apparently.

Further, in U.S. Pat. No. 5,717,789, a method for expanding an image is proposed, wherein high frequency components are estimated by utilizing the fact that zero crossing positions of Laplacian components are constant independent of a sampling rate, when representing an original image by a Laplacian pyramid. However, this technique can only address an expansion with integral multiples.

To solve the above technical problems, it is an object of the present invention to implement a fast processing in resolution conversion, such as image expansion at high resolution. It is another object of the invention to obtain a clear scaled image as a result of resolution conversion processing, without impairing the rough shape of fonts or the like, even on a screen like PC screen that includes a lot of stepped edges.

SUMMARY OF THE INVENTION

To achieve the above objects, according to the present invention, an image conversion method for performing a resolution conversion on original input image data to generate an image scaled by rational number or integral number of times, comprises the steps of: generating first converted image data, wherein connect relations are maintained for a line width included in the original image data even after the resolution conversion; generating second converted image data, wherein the resolution conversion is performed on the original image data while maintaining a rough shape of this line width; and mixing the first and second converted image data in a given ratio.

This mixing step comprises mixing the first and second converted image data in different ratios depending upon a coordinate position on a screen to display the original image data. Further, instead of this mixing step, the method may include a step of generating an image from the generated first and second converted image data.

Further, according to the present invention, an image conversion method for converting original input image data into expansion image data that is expanded less than twice, comprises the steps of: generating first expanded image data, wherein for a one-pixel width line included in the original image data, one pixel width and its connect relations are maintained even after the expansion of less than twice; generating second expanded image data, wherein an expansion processing is performed on the original image data using linear interpolation; and mixing the first and second expanded image data to generate the expansion image data.

The mixing of the first and second expanded image data comprises determining a weight based on a criterion function concerning the spectral power of the original image data, and mixing the first and second expanded image data based on the determined weight, thereby the weights are advantageously determined automatically depending on an image.

The weights can also be set to constant values based on empirical rules, further if the weight "a" is determined in the range of 0.5–0.9, for example, according to a kind of image, a position of image or user's settings, an expanded sharp image for a one-pixel width line can be obtained and jaggies occurring on a straight line or curved line are preferably moderated. The method may further include the step of inputting user's preferences as adjustment values, and wherein the mixing of the first and second expanded image data comprises mixing the first and second expanded image data based upon the input adjustment values, thereby the determination of relative merits about image quality finally comes down to a user's preference.

In another aspect, an image conversion method according to the present invention comprises the steps of: inputting original image data to be expanded at a predetermined scaling factor; when a line width included in the original image data is expanded less than or equal to an integral number of times not exceeding the scaling factor, generating an expanded image while preserving connect relations and color of each pixel composing the line; introducing a predetermined blurring into the expanded image to alleviate jaggies formed in the lines of the expanded image, and outputting the expanded image, wherein jaggies formed there are alleviated.

Here, the jaggy means the situation where an oblique line and curved line or the like are notching. Alleviation of jaggies is done by an interpolation processing for preserving the rough shape of lines composing the original image data. More specifically, an edge is blurred by linear interpolation such as bilinear interpolation and bicubic interpolation.

Further, according to the present invention, an image processing apparatus comprises: input means for inputting original image data to be scaled; linear image conversion means for performing a scaling processing on the input original image data to generate a linear resultant image which lacks spectral components of a high frequency domain; nonlinear image conversion means for performing a scaling processing on the input original image data to generate a resultant image which compensates for the spectral components in the high frequency domain lost by the linear image conversion means; and mixing means for mixing the resultant image generated by the linear image conversion means and the resultant image generated by the nonlinear image conversion means to generate scaled image data.

This nonlinear image conversion means generates a resultant image which preserves the connect relations and colors of lines, even when a line width included in the original image data is expanded less than or equal to an integral number of times not exceeding a scaling factor, thereby enabling to compensate for the spectral components in the high frequency domain in much the same way as the original image data.

Further, this nonlinear image conversion means comprises: a detector for detecting connect relations of a target pixel in the original image data in accordance with a value of the target pixel and values of neighboring pixels; an expanded width detector for determining whether the width of the target pixel can be expanded based on the connect relations that are detected by the detector; and a rule application unit for, according to a relation between a coordinate position of a pixel in the original image data and a coordinate position of a resultant pixel in the scaled image data, defining a plurality of types into which the relation is classified, and applying specific rules for the plurality of types that are defined, based on the output from the expanded width detector.

Further, according to the present invention, an image processing apparatus for converting original input color image data having low resolution into expansion color image data having high resolution, comprises: width examination means, for comparing a target pixel in the original color image data with image data that are composed of peripheral pixels to determine whether the target pixel is a pixel having a small width or a large width; determination means, for determining a value for a resultant pixel that constitutes the expansion color image data, wherein a small width is maintained when the width examination means determines that the target pixel has the small width, or a large width is further expanded when the width examination means determines that the target pixel has the large width; and blurring means for introducing a blurring at a predetermined rate into the resultant pixel which was determined by the determination means.

Here, the expansion color image data is obtained by increasing less than twice the resolution of the original color image data. The width examination means then determines whether a pixel having a small width is a pixel that constitutes a one-pixel width line, and the determination means determines the value of the resultant pixel, so that the one-pixel width is maintained for a corresponding line of the expansion color image data. According to this configuration, a mixture of one-dot width and two-dot width lines can be avoided, thereby providing a very conspicuous and sharp image for users.

The image processing apparatus further comprises: the color examination means, for examining the color of the target pixel in the original color image data, and the determination means, for determining the value of the resultant pixel by using unchanged, without mixing with the color that is identified by the color examination means, the color of the target pixel. For example, in case of a font composing a thin line, a shape of a character is hard to recognize unless pixels to be linked are in the same gradation and tone. However, according to the above configuration, a skeleton line is secured in the same color, thereby enhancing legibility.

Further, according to the present invention, an image processing apparatus for applying a resolution conversion on original image data to generate a converted image scaled by rational number or integral number of times, comprises: an original image data input unit for inputting the original image; a nonlinear processing unit for generating first converted image data, wherein connect relations are maintained for a line width included in the original image data even after the resolution conversion; a multirate processing unit for generating second converted image data, wherein the resolution conversion is performed on the original image data while maintaining a rough shape of the line width; and a mixing unit for mixing the first converted image data generated by the nonlinear processing unit and the second converted image data generated by the multirate processing unit.

Further, the image processing apparatus includes a weight determination unit for determining a mixing ratio of the first converted image data and the second converted image data, wherein the mixing unit mixes the first and second converted image data according to the mixing ratio determined by the weight determination unit.

In addition, the weight determination unit may determine the mixing ratio individually for each pixel to which the resolution conversion was performed. In such a case, for example, a mixing ratio can be changed for a portion in a screen where a change occurs, so it can alleviate a limping phenomenon when dragging an icon or something in GUI.

In case where the image processing apparatus automatically does weight settings, getting spectral power (spectral average power) on a predetermined block basis, for example, a local weight can be set based on an image position. Alternatively, calculating a one-dimensional spectrum for diagonal elements of an image, for example, calculated amount can be advantageously reduced compared with a two-dimensional spectrum.

Further, according to the present invention, an image processing apparatus for converting original image data into expansion image data that is expanded less than twice comprises: input means for inputting original image data; a first processing means, for a one-pixel width line in the original image, for generating an expanded image of one-pixel width while preserving connect relations and color of each pixel composing the line; a second processing means for introducing a predetermined blurring into the expanded image of this one-pixel width to alleviate jaggies formed in the expanded image of this one-pixel width.

This second processing means comprises a linear interpolation processing for preserving the rough shape of one-pixel width lines composing the original image data.

Further, according to the present invention, an image display apparatus for scaling original image data by rational number or integral number of times to display converted image data to a window screen comprises: original image data input means for inputting original image data; linear image conversion means for performing a scaling processing on the input original image data to generate a linear resultant image which lacks spectral components of a high frequency domain; nonlinear image conversion means for generating a resultant image which compensates for the spectral components in the high frequency domain lost by the linear image conversion means; mixing means for mixing the linear resultant image generated by the linear image conversion means and the resultant image generated by the nonlinear image conversion means to generate converted image data; and display means for displaying the converted image data to the window screen.

This original image data input means inputs original image data accompanying movement of images on the screen. Further, the mixing means generates converted image data while selecting the linear resultant image generated by the linear image conversion means when the original image data accompanying the movement of images are inputted by the original image data input means. Since in linear conversion a centroidal point moves evenly, limping and jumping that would occur upon movement can be alleviated.

DESCRIPTION OF THE PREFERRED EMBODIMENT

An image processing apparatus according to the present invention is implemented as a liquid crystal display (LCD) monitor for example, and inputs original image data from a host apparatus such as a connected PC and applies a resolution conversion and outputs to a display unit such as an LCD cell. Also in a notebook-sized PC, it is implemented involving the host side. By the way, further details about an LCD cell and X-Y drivers applying a voltage to its LCD cell are not described here.

Figure 1:
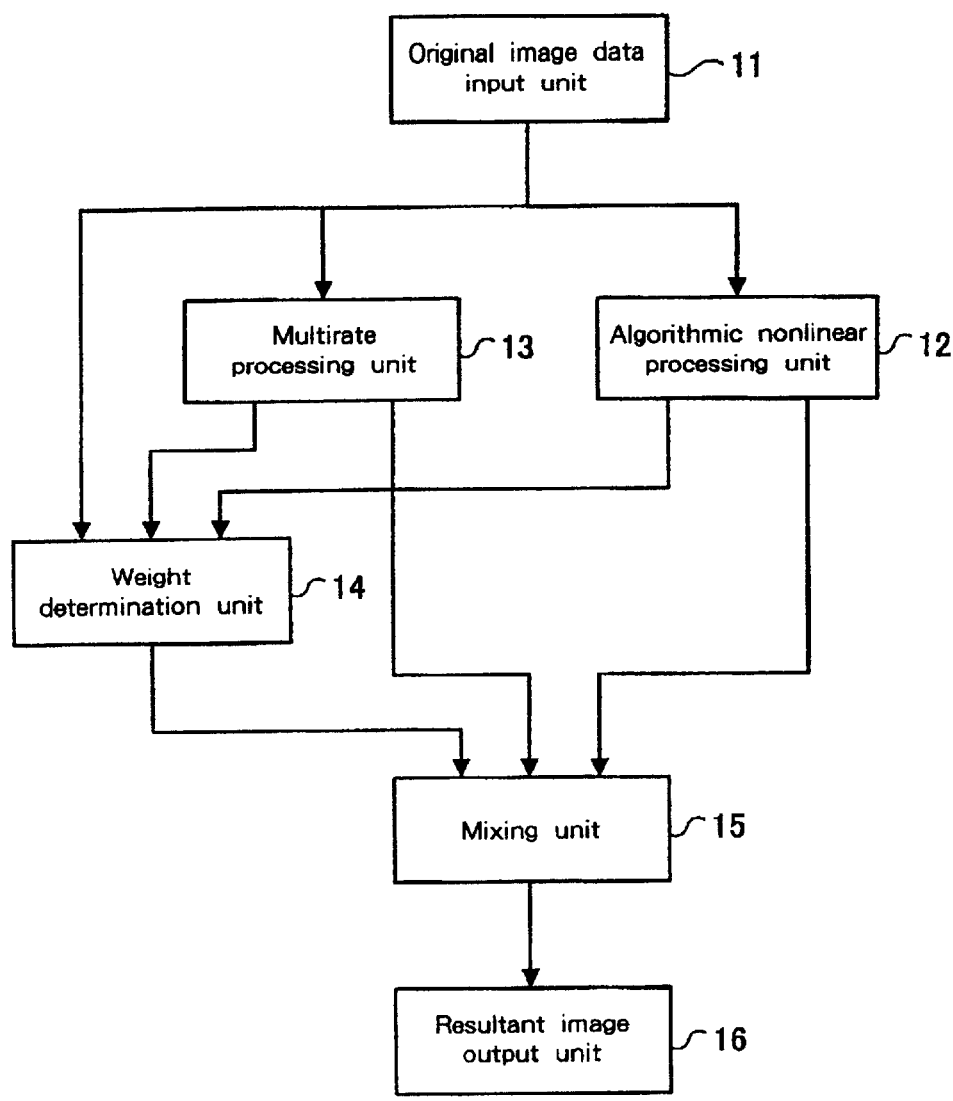
FIG. 1 is a diagram illustrating the arrangement of an image processing apparatus according to one embodiment of the present invention.

FIG. 1 depicts a schematic diagram showing an image processing apparatus according to one embodiment of the present invention. This is implemented, for example, as an LCD controller that is internally provided in an LCD monitor or a notebook-sized PC. A symbol 11 indicates an original image data input unit, which inputs original image data in a processing for each coordinate. As the same way in the scanning of CRT display, for example, pixel values flow into this original image data input unit in time series as one-dimensional data stream composing a continuous horizontal scan lines. Symbol 12 is an algorithmic nonlinear processing unit, where a nonlinear processing for resolution conversion for the scaling of an image is performed based on a given algorithm. By way of example, connect relations and a color of each pixel is maintained based upon the rule-based method. Symbol 13 is a multirate processing unit, where the resolution conversion is performed according to a linear processing as typified by bilinear interpolation or bicubic interpolation, for example. Symbol 14 is a weight determination unit, where an original image that was input from the original image data input unit 11, an algorithmic nonlinear processing image that was applied a resolution conversion by the algorithmic nonlinear processing unit 12, and an image subject to multirate processing are respectively input, and depending upon respective spectral powers, for example, weight (such as mixing ratio) is determined for the algorithmic nonlinear processing image and the image subject to multirate processing. Symbol 15 is a mixing unit, where the algorithmic nonlinear processing image and the image subject to multirate processing are mixed according to the result determined by the weight determination unit 14. Finally, symbol 16 is a resultant image output unit that outputs the results from the mixing unit 15.

Further, the weight determination unit 14 may connect to an adjustment value input unit (not shown) for inputting adjustment values from a user. By means of these adjustment values, the user can select an image quality ranging from sharp image to soft image according to his/her taste.

Next, processing in the algorithmic nonlinear processing unit 12 will be described. As an algorithm used in this unit, a technique proposed in Japanese Patent Application No. Hei 11-365016, commonly assigned to the present applicant can be applied. It will be outlined below, refer to the above application for detail.

Figure 2:
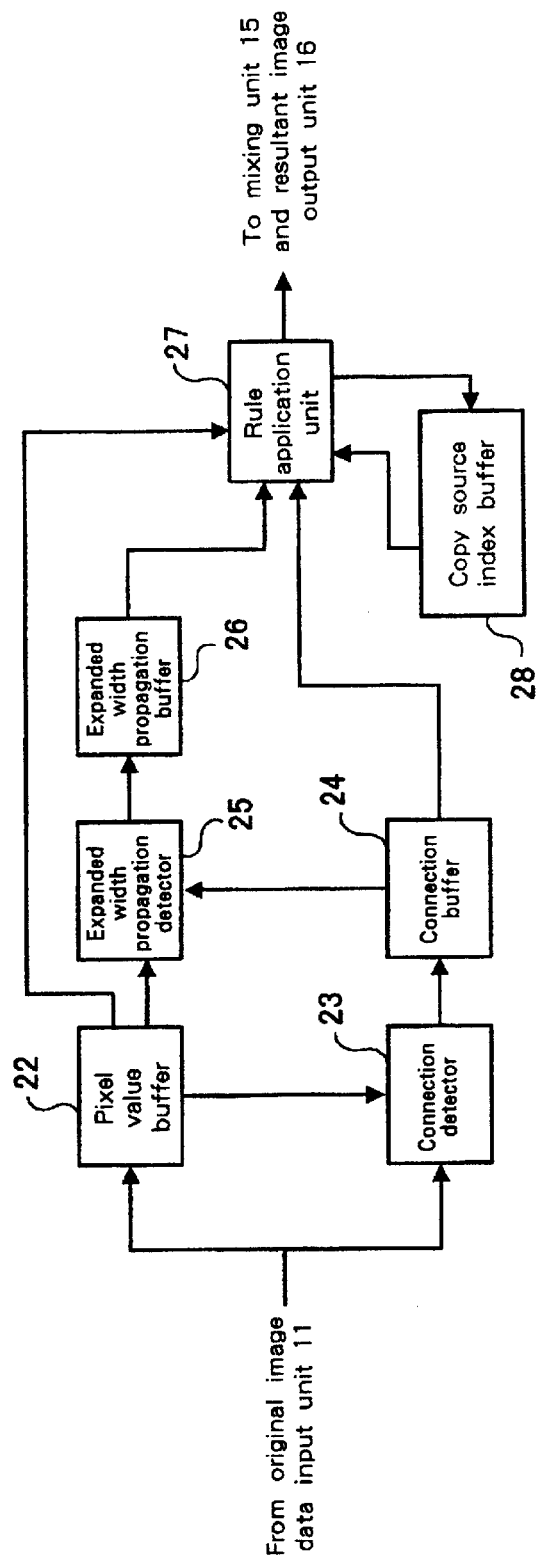
FIG. 2 is a diagram showing the algorithmic nonlinear processing unit 12 according to one embodiment of the present invention.

FIG. 2 is a diagram showing the algorithmic nonlinear processing unit 12 according to one embodiment of the present invention. The algorithmic nonlinear processing unit 12 comprises: a pixel value buffer 22 for storing values of a current target pixel and eight neighboring pixels; a connection detector 23 for sequentially processing pixels one-dimensionally; a connection buffer 24 for storing the obtained connect relations of pixels; an expanded width propagation detector 25 for processing pixels one-dimensionally to determine whether the width can be expanded; an expanded width propagation buffer 26 for storing the results that the width can be expanded or not; a rule application unit 27 for applying a predetermined rule to select a pixel value at determined coordinates from the pixel value buffer 22; and a copy source index buffer 28 for storing the coordinates of the selected pixel value. The outputs from the rule application unit 27 is output to the mixing unit 15 and the resultant image output unit. The pixel value buffer 22, the connection buffer 24, the expanded width propagation buffer 26, and the copy source index buffer 28 are composed as a line buffer or frame buffer.

The pixel value buffer 22 is composed to give the values of a current target pixel and of eight neighboring pixels to the connection detector 23, to give the values of the current target pixel and of pixels at least one pixel apart to the expanded width propagation detector 25, and to give the values of the current target pixel and of the eight neighboring pixels to the rule application unit 27.

The connection detector 23 sequentially processes the pixels one-dimensionally, determines whether the pixel value at the target coordinates and the values of the eight neighboring pixels represent a similar color, and writes the result as 8-bit connection result in the connection buffer 24. The propagation detector 25 also sequentially processes pixels one-dimensionally, refers to the connection results stored in the connection buffer 24 to determine whether the pixel at the target coordinates can be expanded, and writes the result as one-bit data in the expanded width propagation buffer 26. The rule application unit 27 sequentially processes the pixels one-dimensionally, applies the rules to the data received from the connection buffer 24, the expanded width propagation buffer 26 and the copy source index buffer 88, and selects the pixel values at the determined coordinates from the pixel value buffer 22. As the results of the resolution conversion, the pixel values are output as a one-dimensional data stream in time series. The coordinates of the selected pixel values are written in the copy source index buffer 28, and are used for the succeeding application of the rules to expand the width of a pixel.

Next, the algorithm of the rule-based image conversion method for this algorithmic nonlinear processing unit 12 will be described in relation to, for example, the conversion from SXGA (Super Extended Graphics Array) (1280×1024 dots) to QXGA (Quad Extended Graphics Array) (2048×1536 dots), i.e. a conversion with a rational number of times, where the rational number ranges from one up to below two.

Although an expansion with twice or more times or a reduction is not considered here, it can be easily derived by applying this method.

Figure 3:
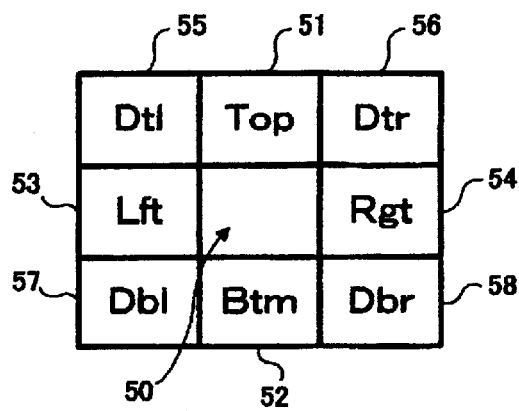
FIG. 3 is a diagram for explaining the neighboring connect relations according to the rule-based image conversion.

FIG. 3 is a diagram for explaining the neighboring connect relations according to the rule-based image conversion.

Each pixel value V [X, Y] of the original image is represented by respective eight bits (0 to FFh) for each R (red), G (green) and B (blue). As is shown in FIG. 3, the neighboring directions for a target pixel 50 are called Top (immediately above) 51, Btm (immediately below) 52, Lft (left) 53, Rgt (right) 54, Dtl (upper left) 55, Dtr (upper right) 56, Dbl (lower left) 57 and Dbr (lower right) 58, and in this embodiment, these directions are called "neighboring connections." The RGB values of each pixel (the target pixel 50) of the original image are compared with those of each neighboring pixel. When the two are the same color, a corresponding bit in eight bits is set to 1, while when the two are different colors, a corresponding bit is set to 0. When, for example, only the Top 51 and the Btm 52 are 1 and the other pixels are 0, it is assumed that an image is a vertical line having a width of one dot and a length of three or more dots. Whether the two pixels represent the same color or not can be determined by determining whether a difference between the RGB values is within a predetermined value, therefor, they need not completely match.

Figure 4:
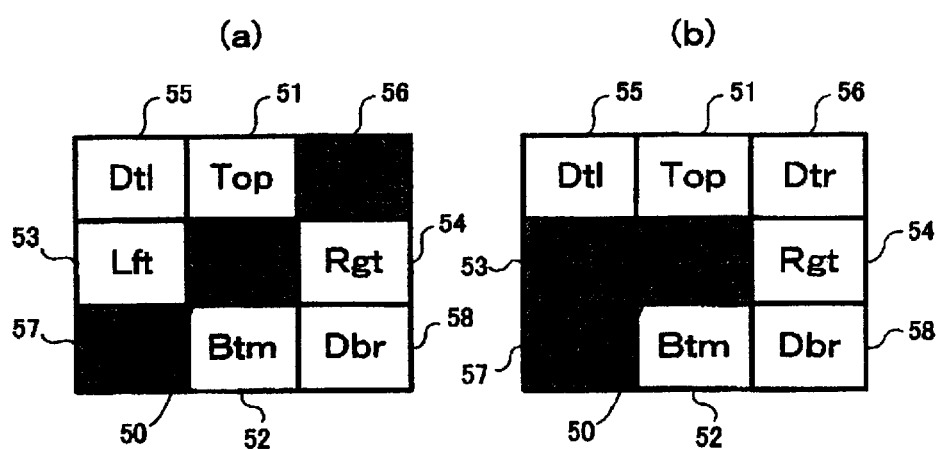
FIGS. 4A and 4B are diagrams showing example neighboring pixel connections.

FIGS. 4A and 4B are diagrams showing the connection of neighboring pixels. In the examples in FIGS. 4A and 4B, boundaries run from upper right to lower left, and the connection is represented by shaded blocks. In FIG. 4A, the oblique boundaries are on the line toward both Top 51 and Lft 53 and on the direction toward both Rgt 54 and Btm 52. And in FIG. 4B, the oblique boundaries are on the line toward both Rgt 54 and Btm 52. A difference between the embodiment and a conventional detection pattern is that a connection is detected for each pixel. For example, in FIG. 4B the target pixel (center point) 50 is connected to Lft 53, but is not connected to Dtl 55 and Top 51. However, when the connection is examined for Lft 53, i.e., when Lft 53 is defined as the center point (target pixel 50), connection to Dtl 55 or Top 51 may be established.

The connections are sorted by tracking the 8-bit connection that is determined for each pixel. That is, if the characteristic can be sorted by performing only one peripheral cycle, tracing is not required. However, if two or more peripheral cycles are required to sort the characteristic, the pixels are recurrently examined; for example, the connection of neighboring pixels that has been established is referred to, and then a neighboring pixel for which a connection has also been established is referred to.

The greatest advantage in determining the connection for each pixel individually is that, for example, even in a pattern where the color gradually changes, one line can be identified as being a single, separate line. And, in this embodiment, the detection of the connections is not for the extraction of text. Hence, regardless of the foreground and the background, and regardless of the meaning of a connection, all the pixels are sorted for detecting connections.

Next, a sorting method employed in accordance with the position of a pixel in the original image will now be described. Since the sorting of the position is easily understood on the analogy of the replica method, the replica method is employed first for the explanation. When the image is expanded 3/2 times using the replica method, a value v(x, y) for the resultant pixel is determined as follows by using a value V [X, Y] for the original pixel.

Type A:
Even numbers for both X and Y of the original coordinates $$v\left(\frac{3}{2}X, \frac{3}{2}Y\right) \leftarrow V[X, Y] \qquad \text{[Equation 1]}$$

Type B:
An odd number for X and an even number for Y of the original coordinates $$v\left(\left\lceil\frac{3}{2}X\right\rceil - 1, \frac{3}{2}Y\right), v\left(\left\lceil\frac{3}{2}X\right\rceil, \frac{3}{2}Y\right) \leftarrow V[X, Y] \qquad \text{[Equation 2]}$$

Type C:
An even number for X and an odd number for Y of the original coordinates $$v\left(\frac{3}{2}X, \left\lceil\frac{3}{2}Y\right\rceil - 1\right), v\left(\frac{3}{2}X, \left\lceil\frac{3}{2}Y\right\rceil\right) \leftarrow V[X, Y] \qquad \text{[Equation 3]}$$

Type D:
Odd numbers for both X and Y of the original coordinates $$v\left(\left\lceil\frac{3}{2}X\right\rceil - 1, \left\lceil\frac{3}{2}Y\right\rceil - 1\right), v\left(\left\lceil\frac{3}{2}X\right\rceil - 1, \left\lceil\frac{3}{2}Y\right\rceil\right),$$
$$v\left(\frac{3}{2}Y, \left\lceil\frac{3}{2}Y\right\rceil - 1\right), v\left(\left\lceil\frac{3}{2}X\right\rceil, \left\lceil\frac{3}{2}Y\right\rceil\right) \leftarrow V[X, Y] \qquad \text{[Equation 4]}$$

The symbols that enclose (3/2)X and (3/2)Y in these equations represent the raising to a unit.

Figure 5:
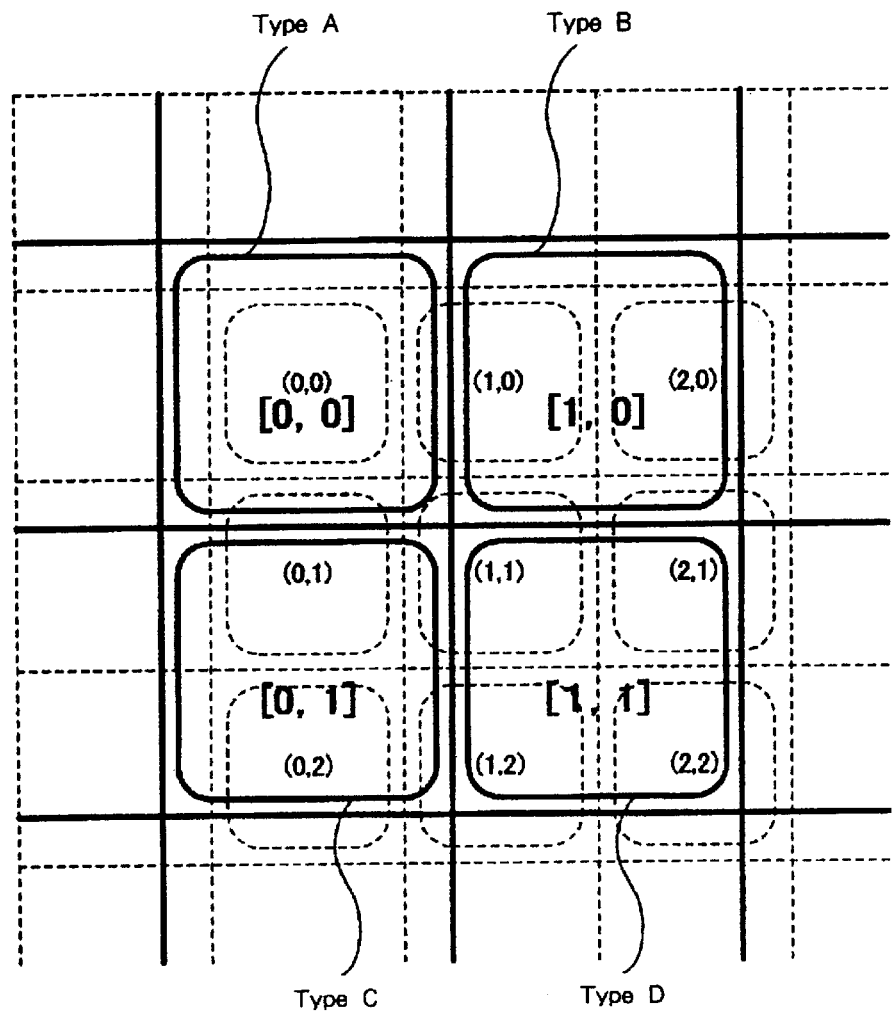
FIG. 5 is a diagram for explaining the relationship of pixel coordinates.

FIG. 5 is a diagram for explaining the coordinates of the pixels. The thick, solid lines represent pixels at the same resolution as the original image, and the thin, broken lines represent pixels at the resolution of the expanded image. [0, 0] represents a pixel having even numbers for X and Y of the original image, and [1, 1] represents a pixel having odd numbers for X and Y of the original image. The coordinates of the resultant image are superimposed so that the center of pixel (0, 0) matches the center of pixel [0, 0] of the original image. [0, 0] of the original image corresponds to type A, [1, 0] corresponds to type B, [0, 1] corresponds to type C and [1, 1] corresponds to type D. These types respectively dominate one pixel, two pixels, two pixels and four pixels of the resultant image.

In this embodiment, sorting of types A to D is employed. That is, when [0, 0] are the coordinates of the original image when it is read from a frame buffer, the pixel (0, 0) of the resultant image is determined. Similarly, pixels (1, 0) and (2, 0) are determined for coordinates [1, 0], pixels (0, 1) and (0, 2) are determined for coordinates [0, 1], and pixels (1, 1), (2, 1), (1, 2) and (2, 2) are determined for [1, 1]. The coordinates of type A are not used for an expansion, and the coordinates of type B (and types C and D) are used for a two-fold image expansion.

In this embodiment, in order to simplify the rule, arbitrary mapping is not performed in [0, 0] to [1, 1]→(0, 0) to (2, 2), and fixed mapping is performed as much as possible.

That is, fixed mapping is performed for the following three types:

Type A: v(0, 0)←V[0, 0]
Type B: v(2, 0)←V[1, 0]
Type C: v(0, 2)←V[0, 1]

While for type D, a rule that allocates $$v(2, 2) \leftarrow V[1, 1]$$

is employed as much as possible. For the other pixels (1, 0), (0, 1), (1, 1) (2, 1) and (1, 2), the value of a neighboring pixel that is to be used is determined in accordance with the rule that is assigned for types B to D.

An explanation will now be given for the rule for employing the connection and the positional relationship of the pixels to determine an expanded image. This rule is employed by a program, and it is difficult to write all the rules out as sentences. Thus, in this embodiment, the configuration policy for the rule will be explained.

(1) When an image is expanded, pixels of types A, B and C of the original image should be mapped at the resultant coordinates that are indicated by positional sorting. A pixel of type D should also be mapped at the resultant coordinates unless a boundary is on the direction toward both Rgt 54 and Btm 52 (the Dbr 58 is located outside of the oblique boundary).

(2) A pixel that is connected should also be connected in an expanded image (for a pattern wherein two lines obliquely intersect, the connection of these two lines must be maintained in an expanded image. And so long as this principle is retained, the rule can be established without clearly distinguishing between the background and the foreground).

(3) When at least two pixels are connected together vertically or horizontally, and form a "boundary" (when the color of two connected pixels is not continued to neighboring pixels on the same side, the pertinent pixels are regarded as a boundary. The pixels on the other sides need not have the same color), the boundary should be also maintained in an expanded image.

(4) Vertical, horizontal and oblique "lines" may be extended along the lines so long as the "boundary" is not destroyed.

(5) If an oblique "boundary" has a length of three pixels or more, it is assumed that this boundary is the original oblique line, and this "boundary" should be formed as an oblique line in an expanded image. When the "boundary" has a length of only two pixels, however, the succeeding sorting of the connection is performed to determine whether the boundary should be expanded as an oblique line or as a stepped line. For an end point, such as a raised portion in a convex character, whether it should be extended as a "line" or should be expanded as an oblique line is determined by performing an examination to determine whether the lower portion is a single line or whether a connection succeeding the lower portion spreads downward.

(6) In a set of pixels that are connected to each other, an element that constitutes a "line" having a one-pixel width (if an element has a length of two pixels or more, it is regarded as a line), the pertinent element should have a one-pixel width in an expanded image. If the portion is expanded into a two-pixel width or greater, the pixels connected in the same direction are also expanded to the same width. This is called propagation.

(7) A "line" having a two-pixel or greater width may be expanded into a three-pixel width or more accordingly. This property is propagated to all the pixels included in the same "line." Similarly, a portion having a 2×2 pixel size or larger may be expanded vertically and horizontally.

(8) A portion having at the least a predetermined size that may be expanded vertically and horizontally is regarded as a so-called "region" for the game of "go". When, as in a stripe pattern composed of lines having a one-pixel width, a stripe that may be expanded can not be locally determined, a line that is connected to the "region" is expanded. The precision and the size of a working buffer are determined in accordance with the distance whereat propagation starts.

(9) An area having a one-pixel width that is enclosed by a line having a one-dot width may be expanded as a "skipping region" if an area outside the enclosed area is a "region," or is continuous from the "region" and represents the same color.

(10) A dot formed of only one pixel that is not connected to any neighboring pixel may be expanded so long as it is inconsistent with another condition.

(11) If, although very seldom, the value of a resultant pixel at the coordinates that must be interpolated can not be determined in accordance with any of the rules, the pertinent pixel is occupied by using the value of the original pixel of a corresponding coordinate type, or by mixing the color with the color of that adjacent original pixel.

If a rule is prepared according to the above policy, the fine structure in an image can be maintained. For example, for expansion by less than twice, the readability is deteriorated if the line having a one-pixel width is converted into a line having a one-pixel width and a two-pixel width. Therefore, the pixel having a one-pixel width remains as it is, and a line having a two-pixel width or more, which is not outstanding even when the width is changed, and a dot, which does not affect the other pixels if it is expanded, are selected and expanded. In other words, the fine structure having a one-pixel width remains as it is even when it is expanded. According to the above policy, the local determination can be performed to ascertain whether a specific pixel is one part of a small font or a detailed figure, or is one part of a line or a photograph/picture originally having a specific width. In this embodiment, by using the implicit estimation of a "region", the foreground and the background are basically treated equally. Since the whole process for determining the background and the foreground is not required and the connection of neighboring pixels is employed to process each pixel, this method is appropriate for high-speed horizontal logic.

Further, the "propagation" distance is restricted in accordance with the size of the working buffer, and this restriction defines the degree of an expansion error due to the rule. Experientially, the propagation distance is either equivalent to or slightly greater than the number of lines in an 8-bit memory in which the connection is stored.

The "arbitrary mapping" that was described for the position sorting process loosens the fixed mapping condition in (1), and an oblique line can be preferably expanded. However, in order to maintain the condition in (2) for defining the "connection" and the condition in (3) for defining the "boundary," a considerably complicated rule must be prepared.

FIGS. 6A to 6D are diagrams showing an example process for expanding an image based on the rule configuration policy. The rules (1) and (2) above are major premises, and are always employed.

Figure 6:
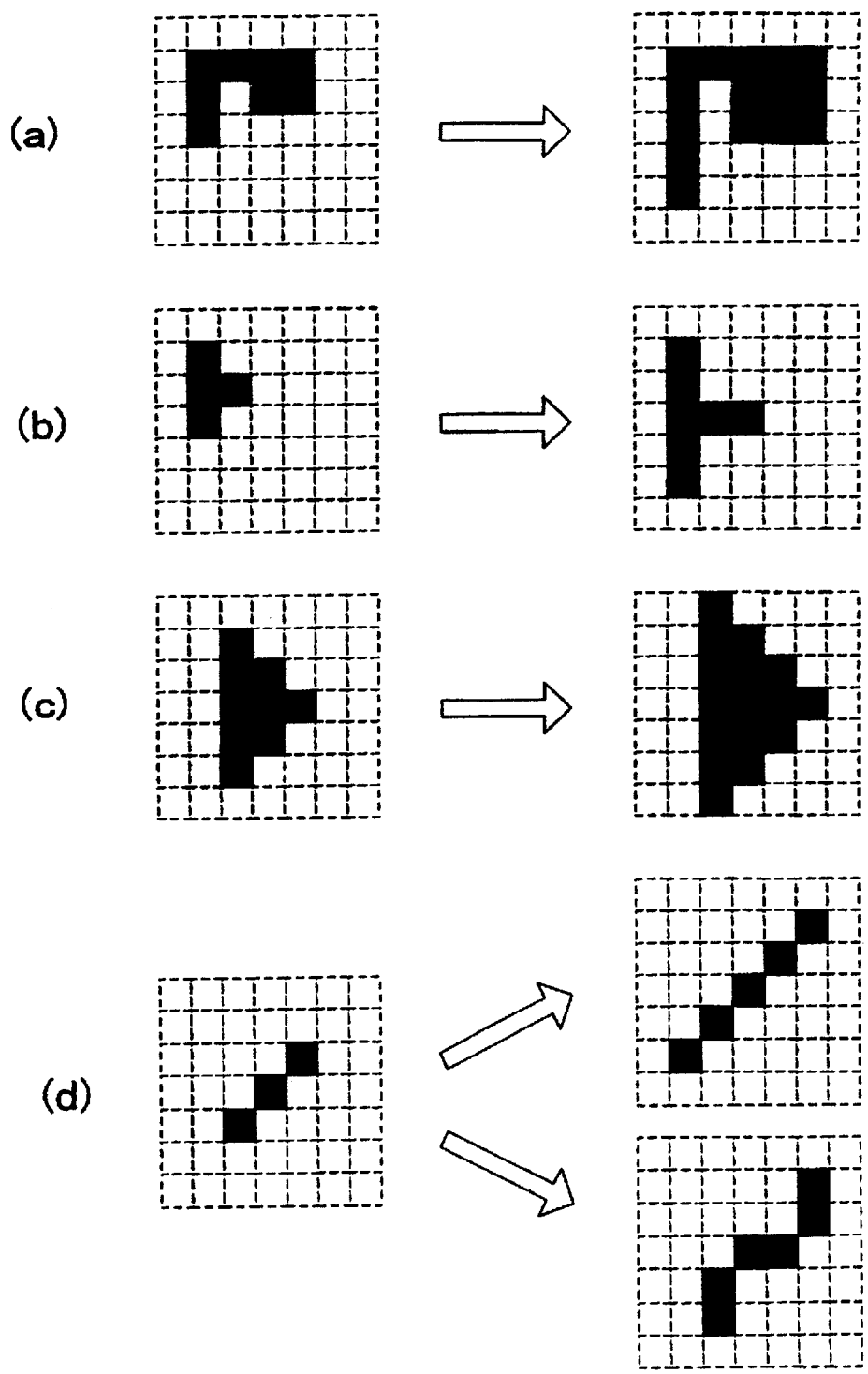
FIGS. 6A to 6D are diagrams showing an expansion example based on the rule configuration policy.

In FIG. 6A, since a left vertical line has a one-dot width, according to the rule (6) the one-dot width is maintained. At this time, according to the rule (4) the line is extended vertically, but only downward because the boundary close to the top side is retained according to the rule (3). A blank inside corresponds to a protrusion of one dot, and according to the rule (5) is extended vertically, not as an oblique boundary, but as a protrusion. Further, according to the rule (7) the solid black 2×2 portion on the right side is expanded into the 3×3 portion. In this example, the boundary is retained according to the rule (3), so that the top side matches the top side of the left vertical line. The blank area is the background in this example, and is expanded according to the rule (7) (extended to the outside of FIG. 6A).

In an example in FIG. 6B, an image is determined to be a protrusion having a convex shape according to the rule (5). In the example in FIG. 6C, an image is determined to be an oblique boundary according to the rule (5).

In FIG. 6D, an image is determined to be an oblique line according to the rule (5), the line is extended obliquely according to the rule (4), and the one-dot width is maintained according to the rule (6). When the original coordinates for the oblique line pass only type A and type D, the rule (1) is employed where the original coordinates are not mapped to the resultant coordinates of type D, and as is shown on the upper right side in FIG. 6D, the image is mapped into a satisfactory oblique line. If the original coordinates of the oblique line pass only types B and C, the rule (1), "the original coordinates should be mapped into the resultant coordinates," is employed, and in response to the request concerning the connection in the rule (2), a jig-jag oblique line is obtained, as is shown on the lower right side in FIG. 6D. In the upper right and the lower right diagrams in FIG. 6D, the rule (2) is also employed for the white area in the background, and the oblique connection is maintained while the black oblique line intersects the white area.

Figure 7:
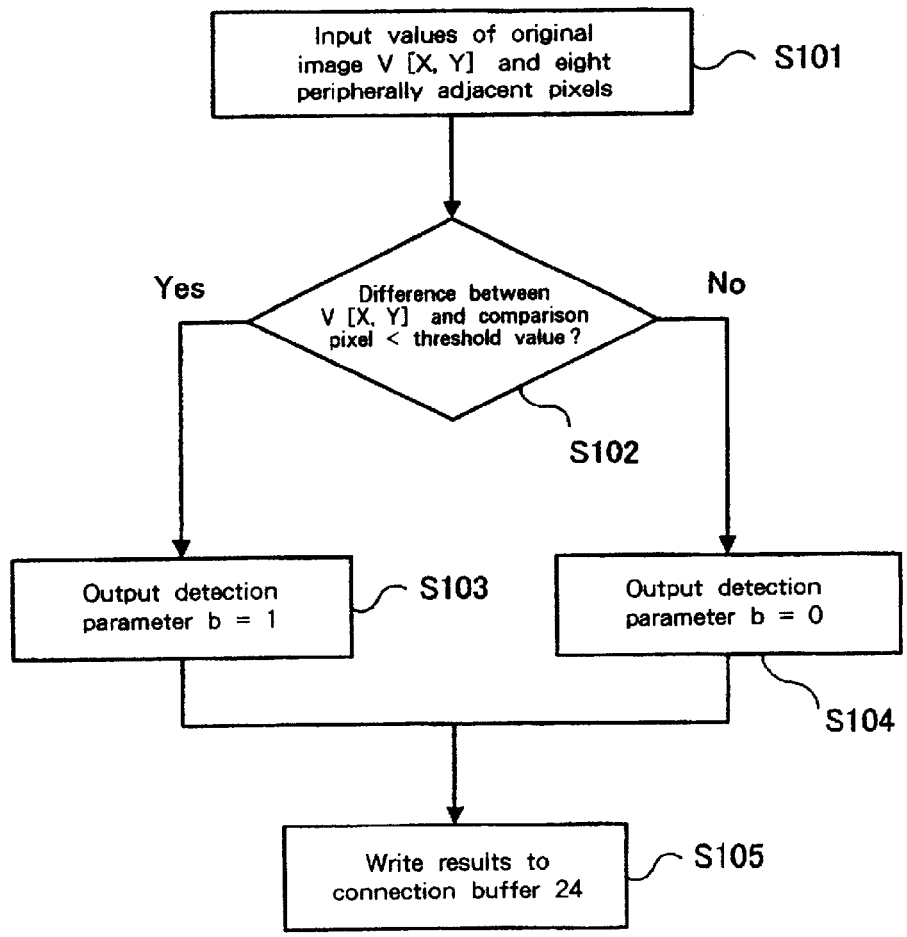
FIG. 7 is a flowchart for explaining the processing performed by a connection detector 23.

FIG. 7 is a flowchart for explaining the processing performed by the connection detector 23. First, the target pixel 50 of the original image V [X, Y] and the eight neighboring pixels are input by the original image data input unit 11 and the pixel value buffer 22 (step 101). Then, the difference between the value of the target pixel 50 and the value of each peripherally adjacent pixel (comparison pixel) is obtained (step 102). If this difference is smaller than a predetermined threshold value, it is assumed that a connection is established between the two pixels, and a detection parameter "b"

is set to 1 (step 103). If the difference is greater than the threshold value, it is assumed that no connection is established, and the detection parameter "b" is set to 0 (step 104). The results obtained at steps 103 and 104 are then stored in the connection buffer 24 (step 105). At this time, when the connection of pixels is detected sequentially by scanning, beginning at the upper left, the process has already been completed for the pixel immediately above (the Top 51), the left upper pixel (the Dtl 55), the right upper pixel (the Dtr 56) and the left pixel (the Lft 53) from the target coordinates [X, Y]. Therefore, these processes can be performed efficiently when the result information is stored in the buffer. In this case, the processing for detecting a connection differs from that in FIG. 7. For an R, G and B color image, at step 102 the difference between the R, G and B values can be determined, and the obtained AND (logical product) can be used as the result produced at step 102.

Figure 8:
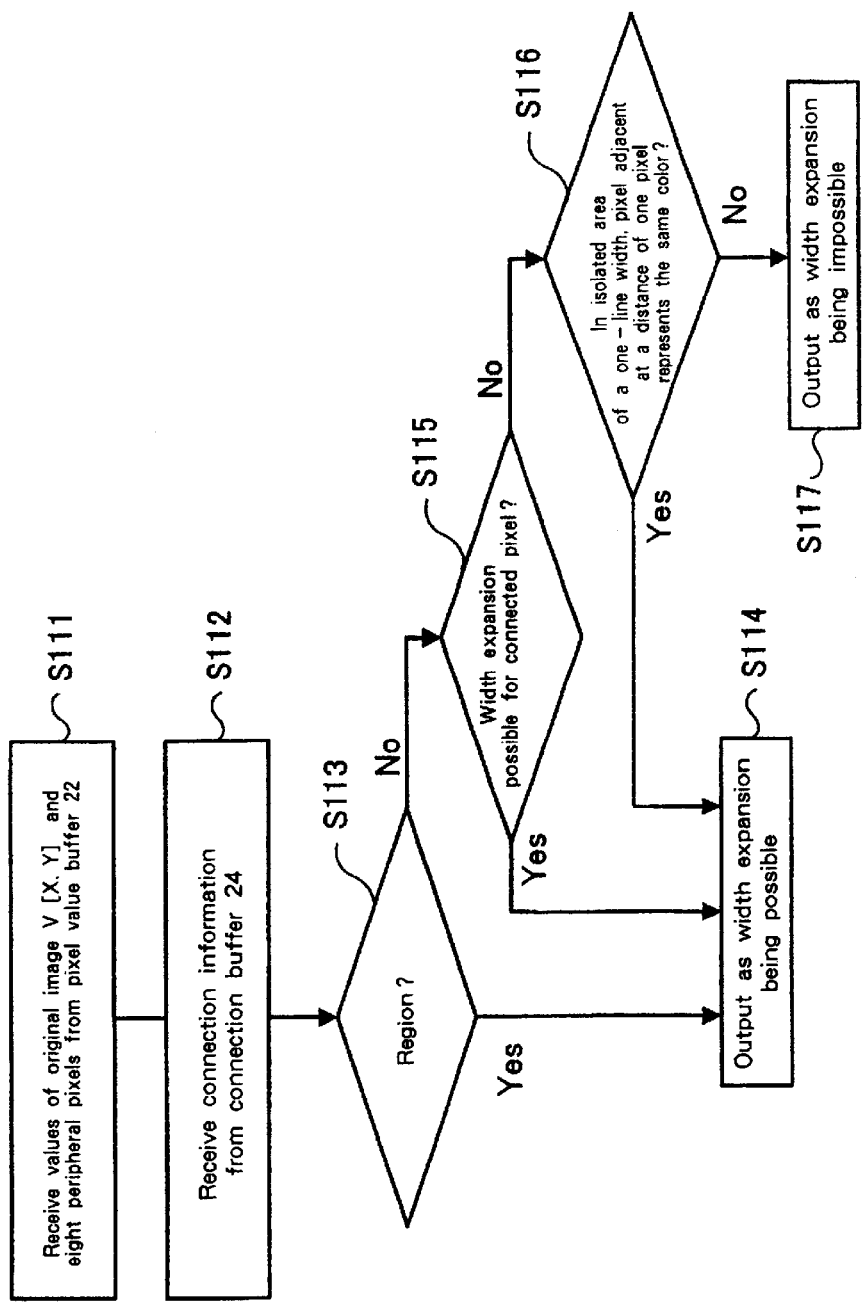
FIG. 8 is a flowchart for explaining the processing performed by an expanded width propagation detector 25.

FIG. 8 is a flowchart showing the processing performed by the expanded width propagation detector 25. First, the current target pixel (the target pixel 50) of the original image V [X, Y] and the eight peripherally adjacent pixels are input by the pixel value buffer 22 (step 111). Following this, the connection information from the connection buffer 24 is input (step 112). These data are employed to determine whether the target pixel 50 is a "region" (step 113). When the target pixel 50 is determined to be a "region," information that the width expansion is enabled is output (step 114), and is written in the expanded width propagation buffer 26. When at step 113 it is determined that the target pixel 50 is not a "region," a check is performed to determine whether the width of the connected pixel can be expanded (step 115). If the width can be expanded, the information that width expansion is possible is output (step 114). If the width can not be expanded, however, a check is performed to determine whether the target pixel 50 is an isolated area having a one-line width, and whether an adjacent pixel separated by a distance of one pixel represents the same color (step 116). If the colors match, information that width expansion is possible is output (step 114). If the colors do not match, information that width expansion is impossible is output (step 117), and is written in the expanded width propagation buffer 26. In other words, if one of the above conditions is true for the connection of pixels, the expanded width propagation detector 25 determines that width expansion is possible and writes this information in the expanded width propagation buffer 26.

Figure 9:
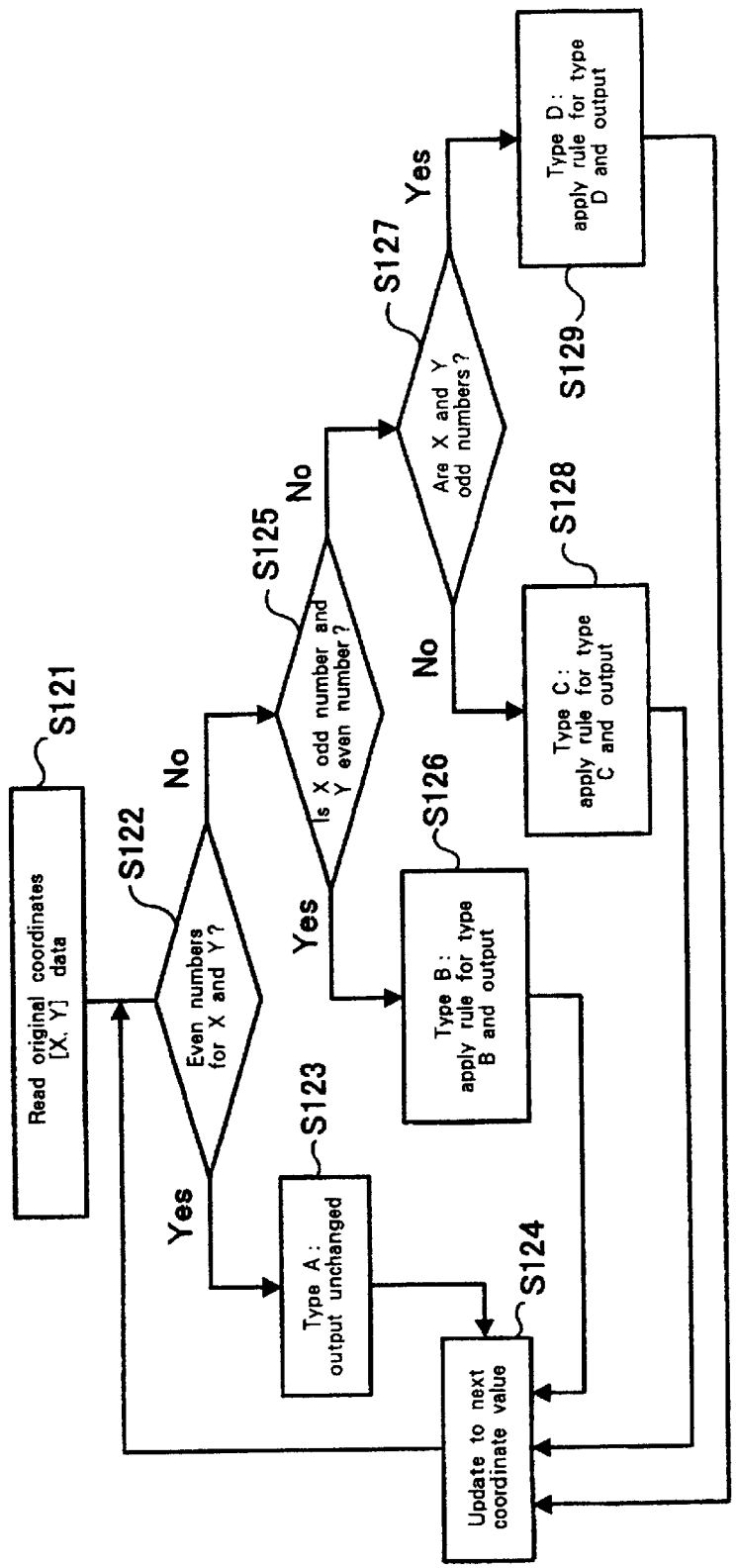
FIG. 9 is a flowchart for explaining the processing performed by a rule application unit 27.

FIG. 9 is a flowchart showing the processing performed by the rule application unit 27. For this processing, an expansion rate of 3/2 is employed. First, the original coordinate [X, Y] data are read (step 121). A check is then performed to determine whether X and Y of the coordinates are even numbers (step 122). If the two values are even numbers, the coordinates are classified type A, and as a result, the value of the original image is output unchanged (step 123). Then, the updating to the next coordinate values is performed (step 124). If the X and Y values are not even numbers, however, a check is performed to determine whether X is an odd number and Y is an even number (step 125). If so, the coordinates are classified type B and are output by employing the above described rule for type B (step 126), and the updating to the next coordinate values is performed (step 124). But if X is not an odd number and Y is not an even number, i.e., if X is an even number and Y is an odd number, the coordinates are classified type C and are output by using the rule for type C (step 128), and the updating to the next coordinate values is performed (step 124). When finally, at step 127, X and Y are determined to be odd numbers, the coordinates are classified type D and the rule for type D is employed (step 129), and the updating to the next coordinate values is performed (step 124). Program control thereafter advances to the next coordinate position, and the above processing is repeated for each coordinate position. When an expansion rate other than 3/2 is employed, the sorting of the coordinates is also performed by referring to the coordinate values X and Y, but in this case, instead of using determination that is based on even and odd numbers, other rules are employed to determine types A, B, C and D.

As described above, according to the resolution conversion with the algorithmic nonlinear processing unit 12, if two pixels neighboring vertically, horizontally and obliquely have a similar color, they are regarded to connect each other, then corresponding to a classification of their connect relations, determining a color of pixels of the expanded image, thereby providing a sufficient spectral power up as far as a maximum frequency component that can be represented with new resolution. As a result, since connect relations and colors are preserved, skeletons of characters are not impaired and the problem of unevenness of colors does not occur.

However, on the other hand, a conversion only in light of the above points of view does not assure the maintenance of a rough spectral shape, therefor possibly providing a resultant image taking on a notching impression. To solve this problem, it is conceivable that a visually effective expanded image is obtained by certainly adding the rough shapes of objects included in the original image to the image compensated for high frequency components by preserving connect relations. For that purpose, according to an embodiment of the present invention, a resolution converted image provided by the algorithmic nonlinear processing unit 12 along the above idea and an image that is linearly resolution-converted by the multirate processing unit 13 while preserving a rough spectral shape of the original image are fused complementarily to make a resolution conversion.

Now a policy to obtain a linear expanded image in the multirate processing unit 13 shown in FIG. 1 will be described. In order to obtain a linear expanded image B(x, y), bilinear interpolation needs the least amount of calculations, while bicubic interpolation is the second least. For sake of simplicity, representing as a one dimension case, bilinear interpolation gives, for a real-valued coordinate X between two adjacent pixels $S[X_k]$, $S[X_{k+1}]$ in the original image, an interpolation value $B_k[X]$ as a weighted average according to a distance.

$$B_k[X] = s \cdot S[X_k] + (1-s) \cdot S[X_{k+1}], \text{ for } X_k \leq X \leq X_{k+1}, s = X - X_k \quad \text{[Equation 5]}$$

For a two-dimensional image, this weighted average should be calculated in both X and Y directions.

When obtaining a resultant image B(x), which is expanded m/n times and again for sake of simplicity expressed as a one dimension case, from this interpolation value $B_k[X]$, several ways of variation would occur depending upon the mapping from x to X.

CASE 1 (matching of centers of leftmost pixels):

$$B(x) = B_k\left[\frac{n}{m} \cdot x\right] \quad \text{[Equation 6]}$$

Namely, the inverse mapping coordinate is as follows.

$$X = \frac{n}{m} \cdot x \qquad \text{[Equation 7]}$$

CASE 2 (matching of centers of pixels at both ends):

$$B(x) = B_k \left[ \frac{X_{\max} - X_{\min}}{x_{\max} - x_{\min}} \cdot (x - x_{\min}) + X_{\min} \right] \qquad \text{[Equation 8]}$$

Namely, the inverse mapping coordinate is as follows.

$$X = \frac{X_{\max} - X_{\min}}{x_{\max} - x_{\min}} \cdot (x - x_{\min}) + X_{\min} \qquad \text{[Equation 9]}$$

CASE 3 (matching of areas of images):

$$B(x) = B_k \left[ \frac{n}{m} \cdot x + \left( \frac{n}{2m} - \frac{1}{2} \right) \right] \qquad \text{[Equation 10]}$$

Namely, the inverse mapping coordinate is as follows.

$$X = \frac{n}{m} \cdot x + \left( \frac{n}{2m} - \frac{1}{2} \right) \qquad \text{[Equation 11]}$$

The case 1 assumes that the center of the leftmost pixel of the original image (coordinate X=0) matches the center of the leftmost pixel of the resultant image (coordinate x=0). According to this, when the original coordinate X is multiple number of n (i.e. the resultant coordinate x is multiple number of m), s=0, therefor no color mixture occurs in an interpolation value. The coordinate like this is called "lattice point". If the rightmost coordinate is not the lattice point, some values must be assumed outside the rightmost point. Since the value for s is fixed, several kinds should be prepared for it, anyhow the calculated amount is small.

The case 2 is the computation just like problem of planting trees, which uses the pixels at both ends in the original image (coordinate $X=X_{min}=0$ and coordinate $X=X_{max}$) as the pixels at both ends in the resultant image (coordinate $x=x_{min}=0$ and coordinate $x=x_{max}$) as it is, and only interpolate pixels between them. Either the ratio of number of pixels or the ratio of interpolation does not match m/n. In general, bilinear interpolation points to this. The advantage is that no values for interporaion are required to be assumed outside the both ends. For drawbacks, a value for s has to be calculated for all inverse mappings one by one, thus the calculated amount becomes large. But the lattice points exist depending on the expansion ratio. In the case 3, the left edge of rectangular pixel at the leftmost pixel in the original image (coordinate X=0) matches the left edge of rectangular pixel at the leftmost pixel in the resultant image (coordinate x=0). In other words, it assumes that a pixel has an area as a rectangle. In this case, it is necessary to assume some values (0 is possible) for interpolation outside the pixels at both ends.

As with bilinear interpolation, the following is given for bicubic interpolation.

$$B_k[X] = (-a \cdot s^3 + 2a \cdot s^2 - a \cdot s) S[X_{k-1}]$$

$$+ ((2-a) \cdot s^3 + (a-3) \cdot s^2 + 1) \cdot S[X_k]$$

$$+ ((2-a) \cdot (1-s)^3 + (a-3) \cdot (1-s)^2 + 1) \cdot S[X_{k+1}]$$

$$+ (-a \cdot (1-s)^3 + 2a \cdot (1-s)^2 - a \cdot s) \cdot S[X_{k+2}],$$

for $X_k \leq X \leq X_{k+1}$, $s = X - X_k$. [Equation 12]

wherein a is a parameter, wherein a=1/2 is commonly used. When a=1/2, $$S[X_{-1}] = 3 \cdot S[X_0] - 3 \cdot S[X_1] + S[X_2]$$

$$S[X_{N+1}] = S[X_{N-2}] - 3 \cdot S[X_{N-1}] + 3 \cdot S[X_N]$$

can be extrapolated as pixels outside the leftmost and rightmost pixels in the original image. The basis for deriving the above equation is the following, i.e. $B_k[X_k]=S[X_k]$, $B_{k-1}[X_k]=S[X_k]$, $B'_{k-1}[X_k]=B'_k[X_k]$ and $B'_k[X_{k+1}]=B'_{k+1}[X_{k+1}]$, and interpolation results keep one-order differential continuity. On the other hand, the basis for a=1/2 assumes that the original image S[X] can be approximated with Taylor series of second order around $S[X_k]$ even in a distance $X_{k+2} - X_k = 2$. However, there is no reason to having to comply with this when using it for blurred image, $0 \leq a \leq 1/2$ can be used to avoid ringing, for example. In case of a=0, interpolation is performed not from four points but two points on both sides, then having the similar results to bilinear interpolation.

Likewise, in bicubic interpolation the problem of lattice point in the inverse mapping of coordinates exists, however, it is not so much outstanding as bilinear interpolation.

Figure 10:
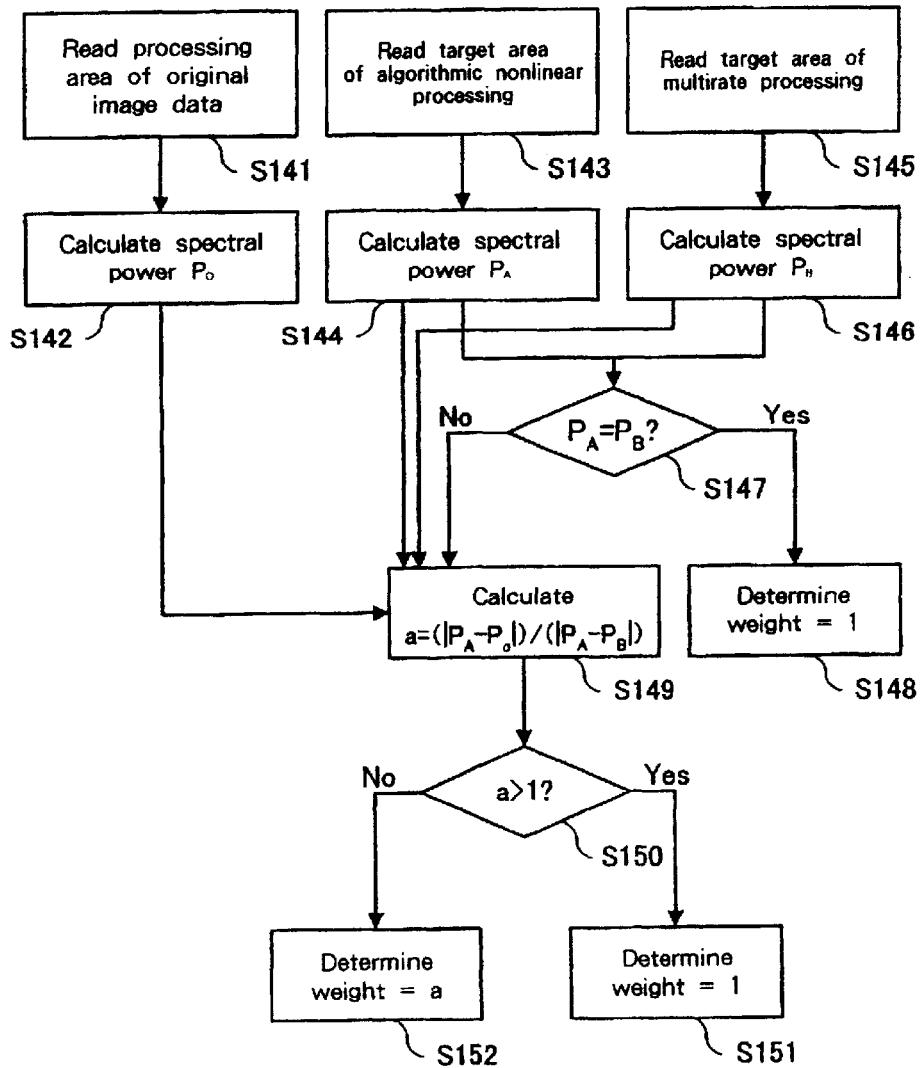
FIG. 10 is a flowchart showing a flow of processing performed in this weight determination unit 14.

Next, a processing performed in the weight determination unit 14 in FIG. 1 will be described. FIG. 10 depicts a flowchart showing a flow of processing performed in this weight determination unit 14. The weight determination unit 14 first reads the processing area of the original image data from the original image data input unit 11 (step 141), then calculates the spectral power $P_o$ from the results of discrete Fourier transform (step 142). Likewise, it reads the target area of the algorithmic nonlinear processing image converted by the algorithmic nonlinear processing unit 12 (step 143), then calculates the spectral power $P_A$ from the results of discrete Fourier transform (step 144). Further, it reads the target area of the multirate processing image converted by the multirate processing unit 13 (step 145), then calculates the spectral power $P_B$ from the results of discrete Fourier transform (step 146). These spectral powers based on discrete Fourier transform are given as follows. Namely, assuming that discrete Fourier transform of a target image I(x, y) to be processed is $F_1(k_1, k_2)$, the spectral power is given as follows.

$$Pg = \frac{1}{N} \sum_{k1} \sum_{k2} |F_1(k_1, k_2)|^2 \qquad \text{[Equation 13]}$$

wherein, N is (sum total of $k_1$)×(sum total of $k_2$).

However, the objects of the above calculation are considered multiple, for example, calculating a spectral power for each of RGB values in the original image and making the medium value among three values the result, or selecting any one of RGB values to calculate a spectral value, or converting RGB values to YIQ values and calculating a spectral power for Y value that corresponds luminance information.

Next, the weight determination unit 14 compares the value of spectral power $P_A$ of the algorithmic nonlinear processing image to the value of spectral power $P_B$ of the multirate processing image (step 147). If these values are the same, determining the weight to be 1 (step 148), while they are different, calculating the value of adjustable load parameter "a" (step 149). The value of "a" is given as follows.

$$a=(|P_A-P_o|)/(|P_A-P_B|)$$

Next, it is determined whether the calculated "a" value is greater than 1 (step 150). If it is greater than 1, the weight is determined to be 1 (step 151), otherwise it is determined to be "a" (step 152).

In this way, "a" may be automatically set, however, using the average spectral power for an entire image results in one value calculated for the entire image, on the other hand, calculating an average spectral power by the block such as 64×64 enables the local setting of "a" depending on a processing position in the image. In addition, if calculated amount of two-dimensional spectrum is problematic, one-dimensional spectrum for diagonal elements of an image may be alternatively calculated.

In the above description, although value "a" is automatically set depending on the spectral power, a predetermined value may be used to simplify the configuration. For example, when using bilinear interpolation or bicubic interpolation, empirically good results are derived with a=0.6–0.8.

Further, since the determination of relative merits about image quality finally comes down to a user's preference, it is one way to commit the determination of the weight "a" to a user. It is also possible to change the value of "a" depending upon whether an image is text or picture. In this case, for example, a=0.5–0.9 is employed depending on a $k_1$nd of image, a position of image, or user's preference.

Next, the mixing unit 15 in one embodiment of the present invention will be described.

Figure 11:
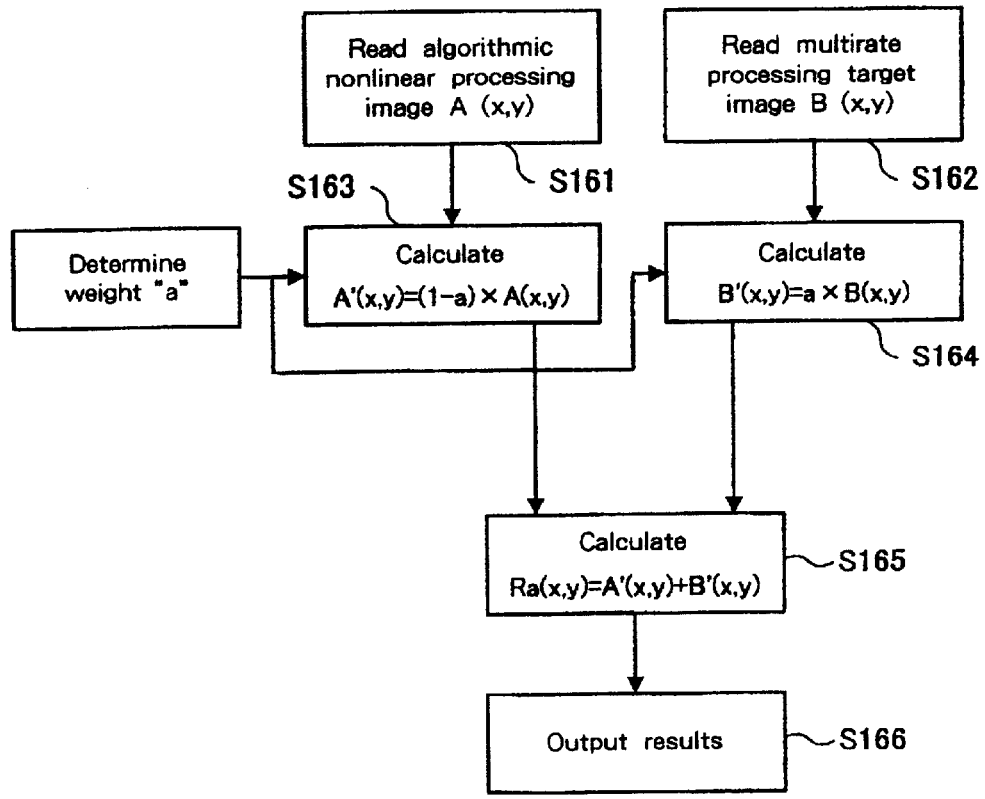
FIG. 11 is a flowchart showing a flow of processing performed in this mixing unit 15.

FIG. 11 depicts a flowchart showing a flow of processing performed in this mixing unit 15. The mixing unit 15 first reads RGB values for a coordinate position (x, y) to be mixed. More specifically, it reads the algorithmic nonlinear processing image A(x, y) that had its resolution converted by the algorithmic nonlinear processing unit 12 (step 161). It also reads the multirate processing target image B(x, y) that had its resolution converted by the multirate processing unit 13 (step 162). Next, it calculates the weighted image A'(x, y)=(1−a)×A(x, y) for the algorithmic nonlinear processing image A(x, y), using the weight "a" that is a adjustable load parameter calculated by the weight determination unit 14 (step 163). Likewise, it calculates the weighted image B'(x, y)=a×B(x, y) for the multirate processing target image B(x, y) (step 164). Then summing up these two kinds of pixels, it calculates the resultant image Ra(x, y)=A'(x, y)+B'(x, y) (step 165). Finally, the resultant image Ra(x, y) is output to the resultant image output unit 16 (step 166).

The above embodiment used a weighted average as a method for mixing an expanded image compensated for high frequency components and a linear expanded image, however, it should not be limited to this. One skilled in the art could easily derive another mixing form, and derive an optimum value of mixing ratio from its derived form.

On the other hand, thinking about the window screen movement or the image movement in the window screen, in a conventional method, a phenomenon where a font limps with changing the shape, or a thin line jumps might occur. In such a case, it is preferable to display an image under linear resolution conversion, in course of change of an image or immediately after the change, with comparing the original image to be displayed with immediately preceding display frame. Because in linear conversion, a centroidal point of a thin line or the like moves evenly, thus limping and jumping do not occur.

In one embodiment, this switching can be implemented only by changing the mixing ratio with the blurred image. Further, since it is also possible to mix for each pixel individually, a mixing ratio can be changed only for the portion in the screen where a change will occur. Also, calculating a mixing ratio locally based on the criterion function, proper mixing can be done depending on the movement.

Figure 12:
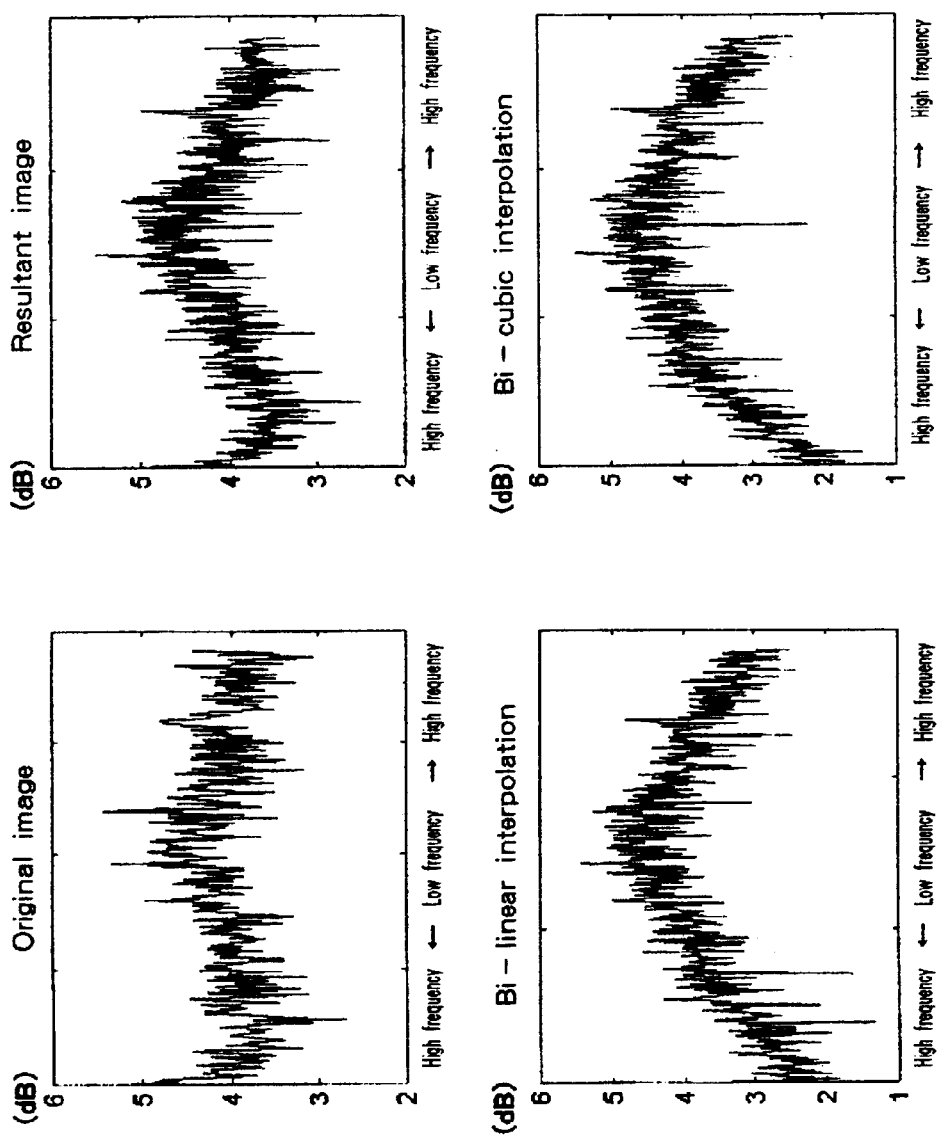
FIG. 12 depicts an example wherein high frequency components are actually compensated for and a formation similar to the spectrum of the original image can be implemented according to the present method.
Figure 13:
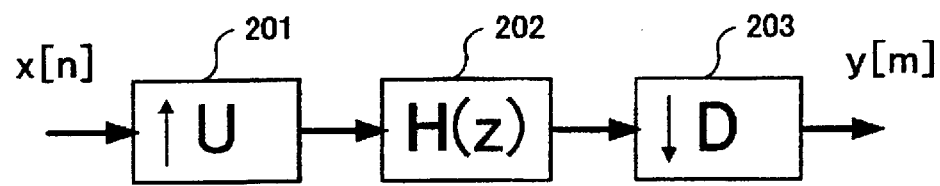
FIG. 13 depicts a multirate system performing U/D-fold sampling-rate conversion.
Figure 14:
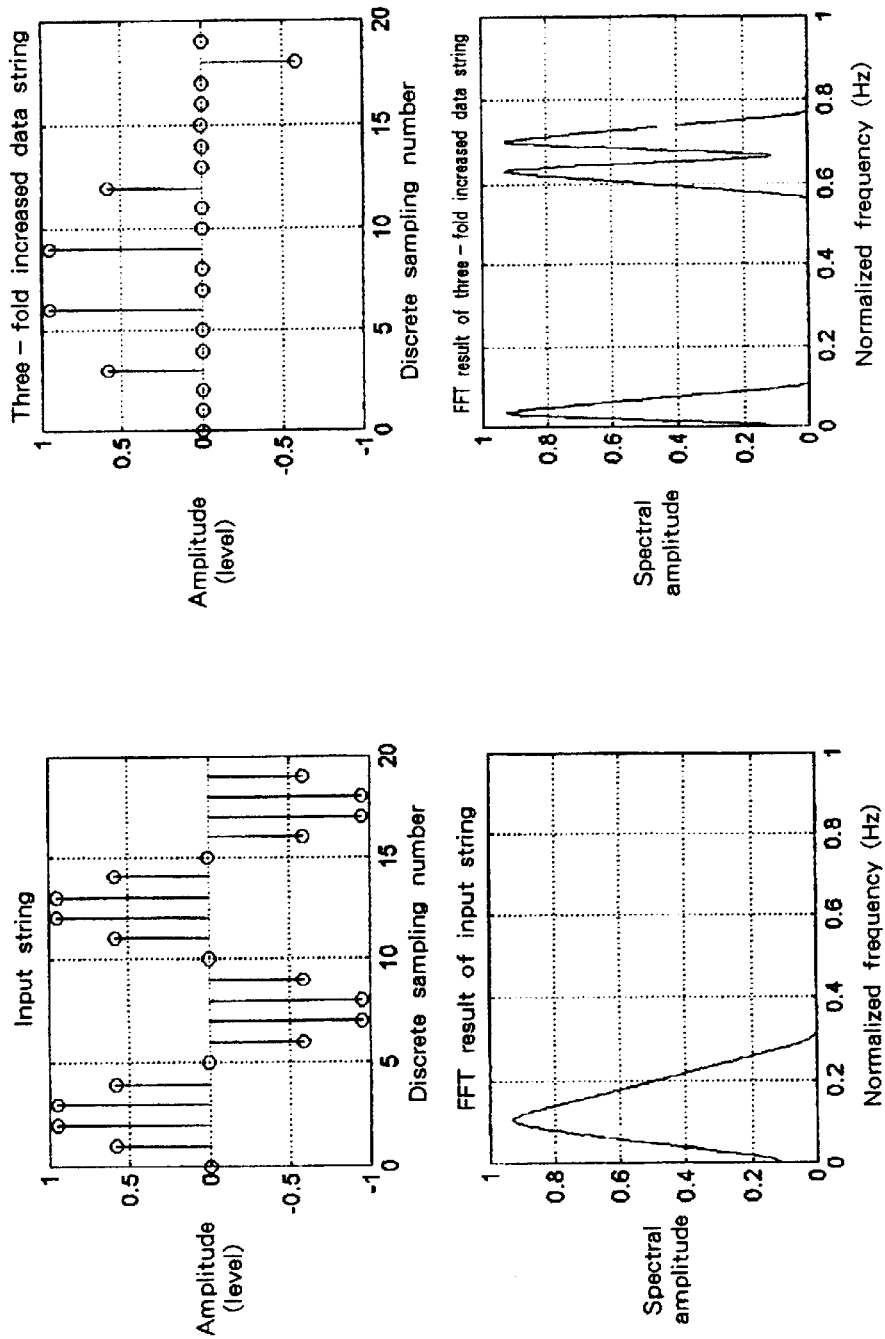
FIG. 14 depicts an example of one-dimensional signals using U=3 for up-sampling.
Figure 15:
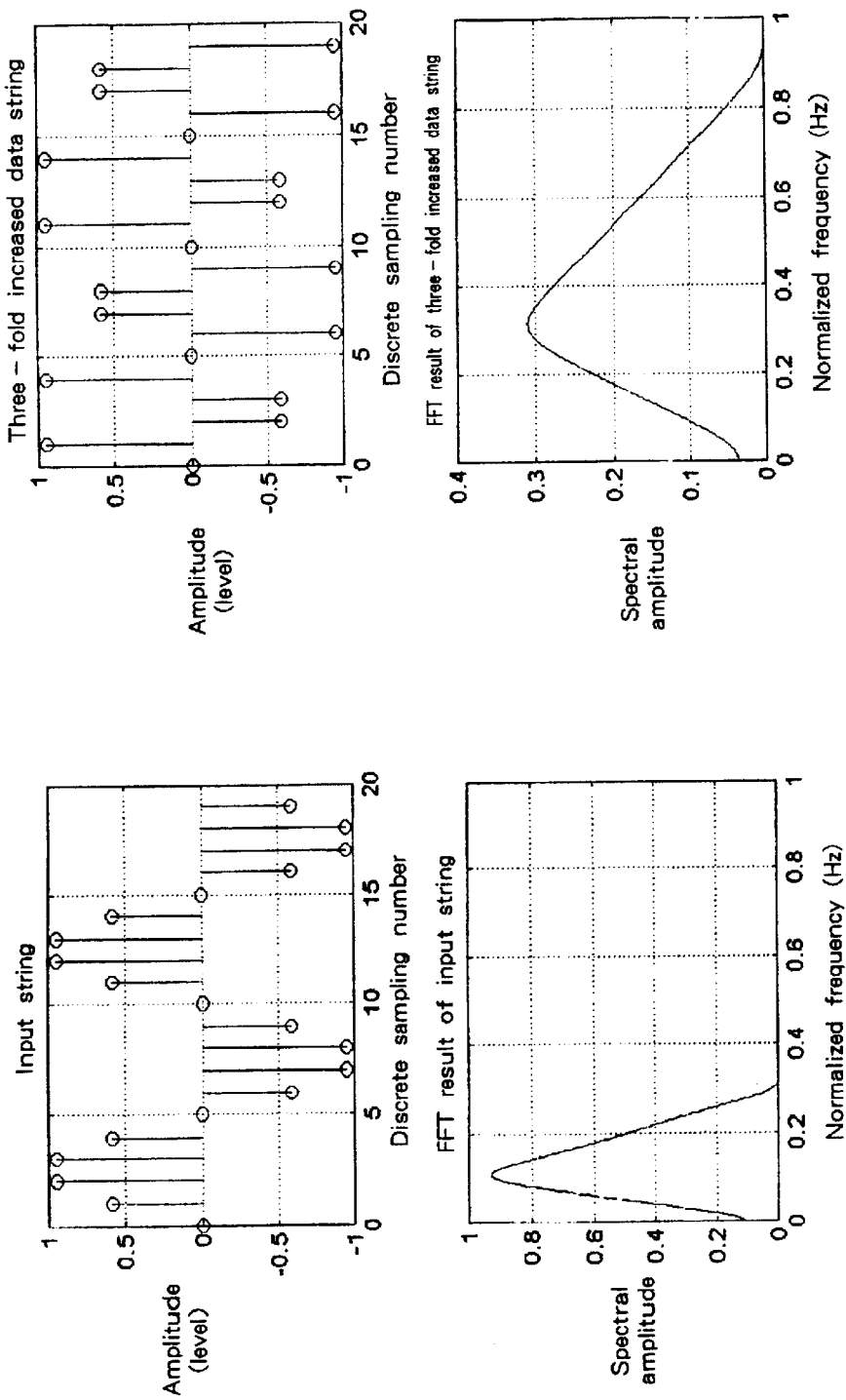
FIG. 15 depicts an example of one-dimensional signals using D=3 for down-sampling.
Figure 16:
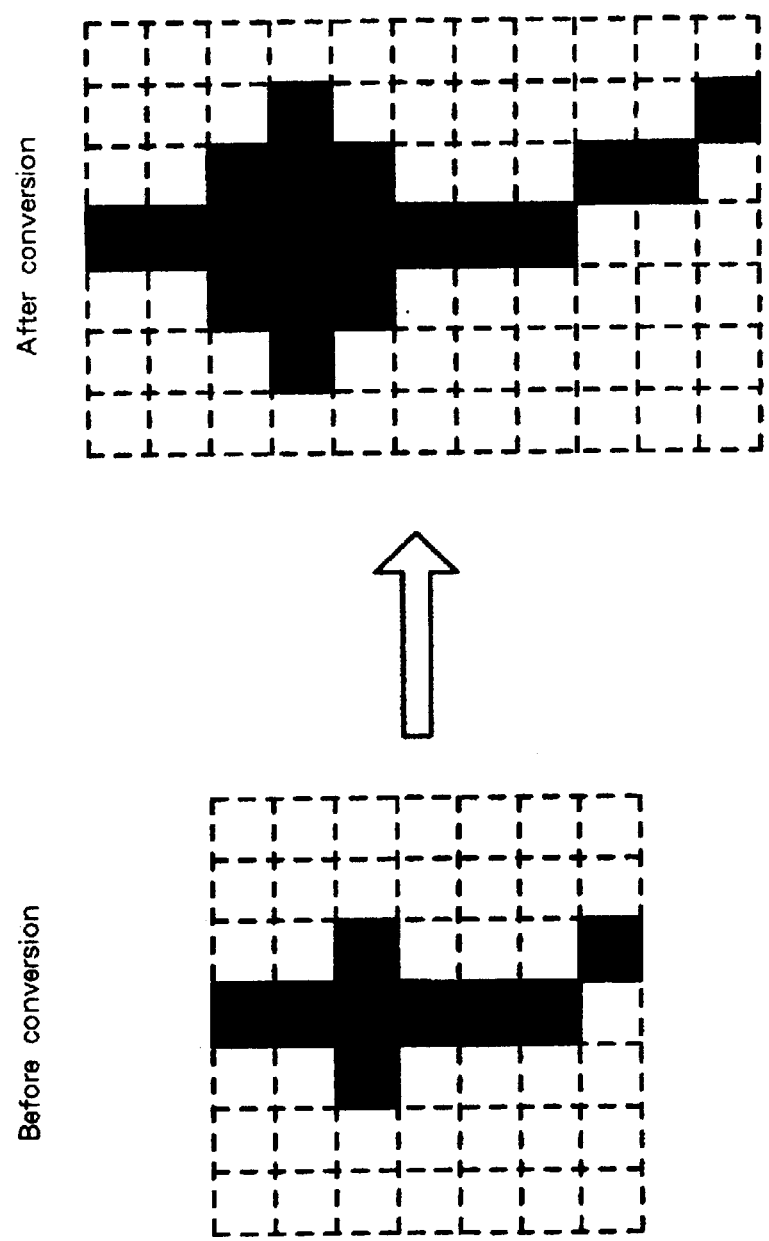
FIG. 16 is a diagram for illustrating a conversion according to the prior art.

FIG. 12 depicts an example wherein high frequency components are actually compensated for and a formation similar to the spectrum of the original image can be implemented according to the present method. The upper left diagram shows FFT (Fast Fourier Transform) values of the original image, and the upper right diagram shows FFT values of an 3/2-fold expanded resultant image which is mixed with bilinear interpolation with a=0.5, according to the embodiment. The lower left and lower right diagrams are FFT values of resultant images according to bilinear interpolation and bicubic interpolation, respectively. In these diagrams, with picking up diagonal elements in a resultant graph of two-dimensional FFT, square of absolute values of their Fourier elements are shown as 10 $\log_{10}$, wherein vertical axis shows decibel(dB), while horizontal axis shows a position where a center region corresponds to low frequencies, while going away from the center region toward both ends, a frequency gradually becomes higher. That is to say, center of each graph represents low frequency components, while heading off to both ends, frequency components becomes higher. An original image is a PC graphics figure composed of oblique lines, straight lines, circles, or ellipses with one-pixel width or two-pixel width, wherein anti-aliasing has not been done. But since an original image is a rectangle, picking up diagonal elements with fitting in with shorter sides, symmetrical spectrum has not been obtained. In bilinear interpolation and bicubic interpolation, high frequency components are lost at the far left, while in the resultant image according to the present method, it is understood that they are compensated for like the original image.

As mentioned above, according to the present invention, even on a graphics screen on an information display device such as an LCD panel or projector, which includes a lot of stepped edges like thin lines, a clear scaled image can be obtained, without impairing the rough shape of fonts or the like.

What is claimed is:

1. An image processing apparatus comprising:

input means for inputting an original image data to be scaled;

linear image conversion means for performing a scaling processing on the input original image data to generate a linear resultant image which lacks spectral components of a high frequency domain;

nonlinear image conversion means for performing a scaling processing on the input original image data to generate a resultant image which compensates for the spectral components in the high frequency domain lost by the linear image conversion means; and mixing means for mixing the resultant image generated by the linear image conversion means and the resultant image generated by the nonlinear image conversion means to generate a scaled image data, and wherein the nonlinear image conversion means comprises:

detector for detecting connect relations of a target pixel in the original image data in accordance with a value of the target pixel and values of neighboring pixels;

an expanded width detector for determining whether the width of the target pixel can be expanded based on the connect relations that are detected by the detector; and a rule application unit for, according to a relation between a coordinate position of a pixel in the original image data and a coordinate position of a resultant pixel in the scaled image data, defining a plurality of types into which the relation is classified, and applying specific rules for the plurality of types that are defined, based on the output from the expanded width detector.

* * * * *